(No Model.)
A. H. OVERMAN.
CYCLE WHEEL.
No. 436,993.  Patented Sept. 23, 1890.
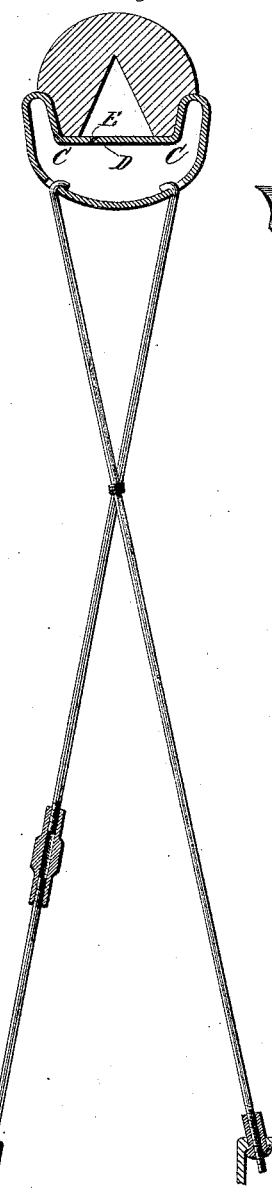
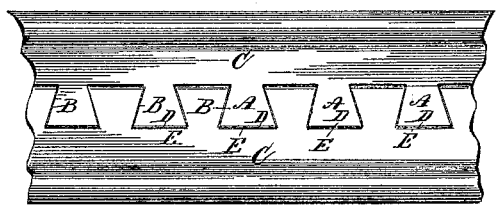
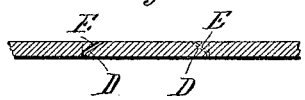
Witnesses
Chas. B. Shumway
Chas. E. Peck
Inventor
Albert H. Overman
By Earle Seymour
Attys

UNITED STATES PATENT OFFICE.

ALBERT H. OVERMAN, OF SPRINGFIELD, ASSIGNOR TO THE OVERMAN WHEEL COMPANY, OF CHICOPEE FALLS, MASSACHUSETTS.

CYCLE-WHEEL.

SPECIFICATION forming part of Letters Patent No. 436,993, dated September 23, 1890.

Application filed July 17, 1890. Serial No. 359,088. (No model.)

*To all whom it may concern:*

Be it known that I, ALBERT H. OVERMAN, of Springfield, in the county of Hampden and State of Massachusetts, have invented a new Improvement in Cycle-Wheels; and I do hereby declare the following, when taken in connection with accompanying drawings and the letters of reference marked thereon, to be a full, clear, and exact description of the same, and which said drawings constitute part of this specification, and represent, in—

Figure 1, a view in vertical section showing one form which a cycle-wheel constructed in accordance with my invention may assume. Fig. 2 is a broken plan view of the rim. Fig. 3 is a greatly-enlarged view of the rim-tread in transverse section; Fig. 4, a detached view showing means for adjusting the wheel-spokes in tension.

My invention relates to an improvement in cycle-wheels, and chiefly to their rims and tires, the object being to simplify and strengthen their rims, to lighten their tires, increase the cushioning action thereof, and give them greater stability, and to stiffen and generally improve the wheels.

With these ends in view my invention consists in a hollow sheet-metal rim having its edges dovetailed together; in a tire having an interior open space in the form of a pointed arch; in an arch-shaped tire having its ends shaped to rest partly upon the tread and partly upon the retaining-flanges of the rim; in a laterally-perforated rim combined with hook-end spokes, and in certain details of construction and combination of parts, as will be hereinafter described, and pointed out in the claims.

Under my invention the edges of the sheet metal from which the hollow rim is made are cut to form the ordinary splayed tenons A and corresponding mortises B of a dovetail joint, which may be located at any convenient point in the rim, but preferably, and as herein shown, in the center of the tread C thereof, which is located in a plane horizontal to the plane of the wheel. The outer faces of the ends of the tenons are by preference beveled, as at D, and the inner walls E of the mortises left square, so that after the edges have been locked together and when the rim is on the forming-rod the inner walls of the mortises may be beaten down and upset over the beveled ends of the tenons, whereby, and as the spring of the metal is outward, the joint will be secured until it can be brazed. I do not, however, limit myself to beveling the tenons, as described, although I now expect to make use of that feature.

My improved tire F is arch-shaped in transverse section and incloses an open space having the form of a pointed arch, the apex whereof extends above the radial center of the tire. The side walls of tires of this form are stiffer than the side walls of tires having their interior spaces shaped in the form of a round arch, and hence are more stable than the same under many conditions of strain and pressure. Moreover, tires of the pointed-arch form stiffen in proportion to the amount of direct pressure imposed upon them, for the reason that their side walls grow gradually wider toward their bases, which rest squarely upon the tread, the same extending horizontally under them, and therefore affording them stable support. The outer faces of the side walls of the tire are cut away on a curve, as at G G, to adapt them to rest partly upon the radial retaining-flanges H H thereof, which are thereto made wider than usual. This construction secures a greater area for the adhesion of the tire to the rim than when the side walls of the tire rest squarely upon the tread, and also gives the tire more stability than it has under the construction referred to by providing for the support of its side walls at points outside of their inner extremities.

The stiffening of the side walls of the tire is of importance, as it tends to prevent side-slipping of the wheel, especially when turning sharply in soft, wet, or so-called "greasy" road bed or soil. The inclination of the wheel in making the turn throws the weight of the machine and rider almost wholly upon one of the side walls of the tire, and if that side wall be well supported and will stand up under the weight and strain the danger of a side slip will be in a large measure averted. At the same time the stiffening of the side walls of the tire does not, under the normal conditions of riding, measurably detract from its cushioning when the weight is upon the center of its arch or crown, which flattens down under pressure and secures a stable and easy-rolling surface for the wheel.

The rim is laterally perforated, as at I I, to receive the hook ends J J of the spokes K K. The said perforations, as shown, are arranged in pairs in the same transverse plane, with the spokes in contact and tied, as at L. If desired, however, the perforations may have a staggered arrangement, and the spokes disposed accordingly. As the spokes cannot themselves be turned to adjust them in tension, they must be provided with adjusting-nuts, which may take a variety of forms, some of which have been chosen for illustration. Of these I prefer the sleeve M, having right and left hand threads, and located between the ends of the spoke, which is thereto made in two pieces, the inner piece being screwed into the hub-flange Q or otherwise secured to the same. If desired, these sleeves may be arranged close to the hub-flange N, as shown by Fig. 4 of the drawings, or the spokes may be adjusted by nuts like the headed nipple-nut O, which passes through a cup-shaped hub-flange P. I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. A hollow sheet-metal rim having its edges dovetailed together, substantially as described.

2. A hollow sheet-metal rim having its edges dovetailed together in the center of its tread, substantially as described.

3. A hollow sheet-metal rim having its edges cut to form the splayed tenons and corresponding mortises of a dovetail joint and the ends of its tenons beveled, substantially as described.

4. The combination, with a hollow sheet-metal rim having a horizontal tread and radial retaining-flanges, of an arch-shaped tire having its side walls shaped to bear partly upon the retaining-flanges of the rim and partly upon the tread thereof, which extends horizontally under them and therefore affords them stable support, substantially as described.

5. A hollow sheet-metal rim having lateral perforations and hook-end spokes therefor, substantially as described.

6. A hollow sheet-metal rim having lateral perforations arranged in pairs in the same transverse plane and hook-end spokes to enter the said perforations, substantially as described.

7. A hollow sheet-metal rim having lateral perforations, in combination with hook-end spokes crossed and tied, as shown, substantially as described.

8. A sheet-metal rim having lateral perforations, in combination with hook-end spokes and adjusting-sleeves having right and left hand threads for adjusting the spokes in tension, substantially as described.

9. A rubber tire having an interior open space formed in it, and a pointed arch, the apex whereof extends above the radial center of the tire, so that the tire is made more elastic at the center of its bearing-face than near the edges thereof, substantially as described.

ALBERT H. OVERMAN.

Witnesses:
A. M. M. OVERELL,
B. C. BREWSTER.